July 12, 1949.  T. T. SHORT  2,476,068

ELECTRIC VIBRATORY CONVERTER CIRCUIT

Filed Sept. 21, 1945

Inventor:
Thomas T. Short,
by Ernest C. Britton
His Attorney.

Patented July 12, 1949

2,476,068

UNITED STATES PATENT OFFICE 2,476,068

ELECTRIC VIBRATORY CONVERTER CIRCUIT

Thomas T. Short, Fort Wayne, Ind., assignor to General Electric Company, a corporation of New York Application September 21, 1945, Serial No. 617,859

3 Claims. (Cl. 321—49)

This invention relates to electric circuits having an inductive device with a magnetic core and more particularly to improvements in vibratory converters.

A typical vibratory converter has a transformer connected to a vibratory polarity changing switch. When operated as an inverter, the switch effectively converts direct current to alternating current and this is transformed to the proper value by the transformer. Usually the inverter is provided with a driving coil for the switch which is so arranged that the device will be self-starting.

The major problem in such devices is the relatively short life of the switch contacts and I have found that the life of the contacts is very materially increased if the transformer is reversely premagnetized prior to starting the device.

An object of the invention is to provide a new and improved vibratory converter.

Another object of the invention is to prolong the life of the contacts of a vibratory converter.

A further object of the invention is to provide a new and improved electric circuit having an inductive device with a magnetic core.

An additional object of the invention is to provide a novel arrangement for minimizing the inrush current to an inductive device having a magnetic core.

The invention will be better understood from the following description taken in connection with the accompanying drawing and its scope will be pointed out in the appended claims.

Figure 1:
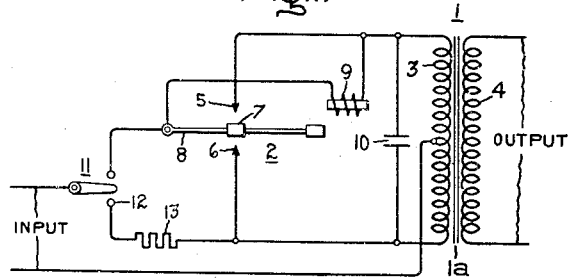
Figure 5:
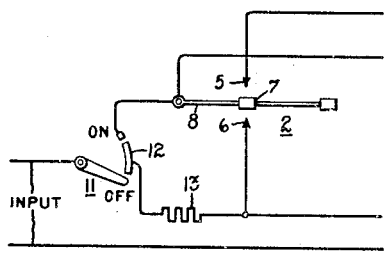
Figure 2:
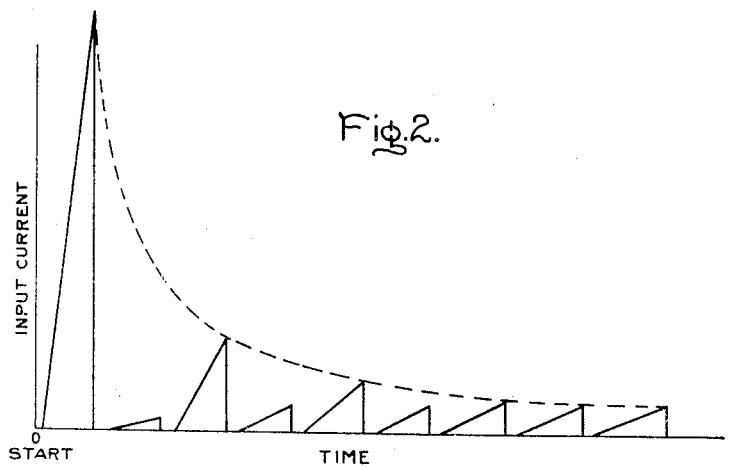
Figure 3:
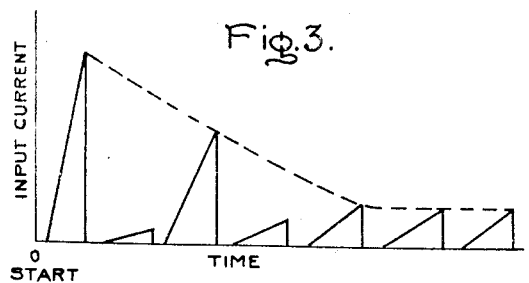
Figure 4:
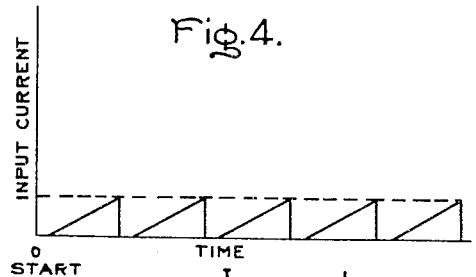

In the drawing Fig. 1 illustrates diagrammatically an embodiment of the invention; Figs. 2 and 3 are input transient starting current curves of a conventional inverter under different conditions; Fig. 4 illustrates the transientless starting input current obtained with the present invention, and Fig. 5 is a modification.

Referring now to the drawing and more particularly to Fig. 1, there is shown therein a vibratory inverter comprising a transformer 1 and a vibratory switch 2. The transformer has a magnetic core 1a provided with a center tapped primary winding 3 and a secondary winding 4. The end terminals of the primary winding 3 are connected respectively to fixed contacts 5 and 6 between which is a vibratory contact 7 which may be mounted on a reed 8. Connected between contacts 5 and 7 is a driving coil 9 which is offset in one direction from the position of rest of the reed 8. A so-called buffer capacitor 10 is connected across the primary winding 3 for the purpose of reducing the contact sparking during normal operation of the inverter. An input circuit has one side thereof connected to the midpoint of the primary winding 3 and has the other side thereof selectively connectible to the reed 8 by means of a switch 11.

For providing transientless starting of the inverter I provide starting switch 11 with an auxiliary contact 12 which is connected to the opposite terminal of the primary winding 3 from that which is initially energized when the driving coil 9 is first energized. Preferably, a current limiting resistor 13 is connected in series with the auxiliary contact 12.

The operation of Fig. 1 is as follows: When it is desired to start the inverter the switch 11 is moved from its "off" position, in which it is shown, downwardly so as to complete a circuit through the auxiliary contact 12, the resistor 13 and the lower half of the primary winding 3. The switch is then moved to its upper or "on" position so as to complete a circuit through the driving coil 9 and the upper half of the primary winding 3. The energization of the driving coil causes the movable contact 7 to be moved into engagement with the contact 5, thereby short-circuiting the driving coil 9 and causing a normal pulse of current to flow through the upper half of the primary winding 3. The short-circuiting of the driving coil 9 of course deenergizes it so that the reed 8 springs away from the fixed contact 5 and into engagement with the contact 6, thereby causing another pulse of current to flow through the lower half of the primary winding 3. In the meantime, the driving coil 9 has been reenergized so that the above cycle repeats itself over and over again at the natural period of vibration of the reed 8. The alternate current impulses in opposite directions through the two halves of the primary winding 3 cause periodic reversal of flux in the core 1a and thus induce an alternating voltage in the output circuit.

Fig. 2 is an oscillogram of a very bad starting transient of a conventional vibratory inverter which is not provided with my invention. It will be seen in that figure that the input current, starting from zero, rises to a very high value during the first or initial contact closure and that the input current during the opposite contact closure is negligible. As time proceeds the magnitude of the odd-numbered current impulses decreases and the magnitude of the even-numbered impulses increases until they become equal. Occasionally the initial current impulse is so large that the contacts cannot interrupt it so that the arc is carried across between the contacts 5 and 6, in which case there will be a permanent short-circuit as the current flowing simultaneously in opposite directions in the two halves of the primary winding will neutralize the reactance of this winding with the result that the contacts are destroyed by the heavy short-circuit current.

The reason for the pronounced starting transient shown in Fig. 2 is that the core 1a had a relatively high residual flux which corresponded in direction to the magnetizing effect of the initial current impulse through the primary winding 3. It will be observed in Fig. 1 that the inverter always starts with a pulse of current in the same direction through the upper half of the primary winding 3. However, the switch 11 can be opened at any time for the purpose of deenergizing the inverter so that there is a random direction of residual flux in the core 1a. If it should happen, as it not infrequently does, that the residual flux is in the same direction as the initial magnetization of the core when the inverter is started, then the core becomes highly saturated on the initial current impulse with the result that the magnetizing current goes to a very high value, as is shown in Fig. 2.

Fig. 3 shows the input current when the inverter starts with zero residual flux in the core 1a and it will be seen that the peak value is substantially less than in Fig. 2.

Fig. 4 illustrates the transientless starting obtained with my invention and it will be observed that the initial current impulse is substantially identical with subsequent current impulses. This is the result of the reverse premagnetization of the core 1a by the preliminary closure of the starting switch on the contact 12. By making the resistance 13 of the proper value the residual flux in the core may be made equal in magnitude, although opposite in direction, to the normal peak flux value attained during normal operation of the inverter. Consequently, the inverter starts without any abnormal inrush current because during the first impulse the flux is carried from the normal peak value of flux in one direction to the normal peak value of flux in the other direction, which corresponds to a normal half cycle of operation.

In the modification shown in Fig. 5 the switch 11 has been shown as having its "off" position at one end of its range of travel and the auxiliary contact 12 has been shown between the movable contact and the main "on" or starting contact. Therefore, in the operation of this switch when it is moved from its off position to its on position there is a preliminary dwell on the auxiliary contact 12 which then completes the premagnetizing circuit through the resistor 13, as in Fig. 1.

While there have been shown and described particular embodiments of this invention, it will be obvious to those skilled in the art that various changes and modifications can be made therein without departing from the invention and therefore it is aimed in the appended claims to cover all such changes and modifications as fall within the true spirit and scope of the invention.

What I claim as new and desire to secure by Letters Patent of the United States, is:

1. In combination, a transformer winding having a magnetic core, means for selectively energizing said winding with alternating current and deenergizing it, said means always initiating energization of said winding so as to produce a starting magnetization in a given direction in said core and deenergizing it at random, and separate means for transiently unidirectionally energizing at least a portion of said winding for so premagnetizing said core that its residual flux is in opposition to its starting magnetization in order to minimize the starting inrush current of said winding.

2. In combination, a magnetic core, a winding on said core, circuit controlling means for causing selective energization and deenergization of said winding, said energization being with a symmetrically applied voltage of alternating polarity for a time which is long enough to establish a zero average value of flux in said core regardless of the amount of residual flux in said core when said winding is energized, said circuit controlling means always producing an initial magnetization in a given direction in said core, a second winding on said core adapted to be connected to a load circuit having a substantial impedance, and separate means for transiently unidirectionally energizing at least a portion of said first mentioned winding for insuring that the residual flux in said core is opposite in polarity to the initial magnetizing direction of said core whenever said circuit controlling means causes energization of said winding.

3. In combination, a vibratory contact inverter and a three-position control switch, said inverter having a direct current input circuit and an alternating current output circuit, a transformer having a primary winding and having a secondary winding connected to said output circuit, a vibratory contact polarity reversing switch connected to said primary winding, a driving coil for said vibratory contact switch which always starts said switch from rest in the same direction, one of the positions of said control switch being an off position for opening said input circuit, another position of said control switch being a starting position for completing said input circuit through said primary winding exclusive of said vibratory switch, the third position of said control switch being a running position for completing said input circuit through said vibratory switch and primary winding, the polarity of the transformer flux when said control switch is in its starting position being opposite to the polarity of the transformer flux when said vibratory switch first starts.

THOMAS T. SHORT.

REFERENCES CITED

The following references are of record in the file of this patent:

UNITED STATES PATENTS

| Number | Name | Date |
| --- | --- | --- |
| 1,994,635 | Cohen | Mar. 19, 1935 |
| 2,156,708 | Sullivan | May 2, 1939 |
| 2,213,541 | Bartels | Sept. 3, 1940 |
| 2,222,214 | Carmichael | Nov. 19, 1940 |
| 2,265,717 | Bedford | Dec. 7, 1941 |